Oct. 18, 1966 U. KÜHL 3,280,343

COUNTING CHAIN CONSISTING OF ELECTRONIC SWITCHING UNITS

Filed July 3, 1964 3 Sheets-Sheet 1

COUNTING CHAIN CONSISTING OF ELECTRONIC SWITCHING UNITS

Filed July 3, 1964 3 Sheets-Sheet 2

United States Patent Office 3,280,343
Patented Oct. 18, 1966

3,280,343
COUNTING CHAIN CONSISTING OF ELECTRONIC SWITCHING UNITS

Ulrich Kühl, Munchingen, Germany, assignor to International Standard Electric Corporation, New York, N.Y., a corporation of Delaware Filed July 3, 1964, Ser. No. 380,159
Claims priority, application Germany, July 16, 1963, St 20,863
7 Claims. (Cl. 307—88.5)

The invention relates to a counting chain, consisting of electronic switching units, in which the pulse inputs of all switching units with an odd number are connected to a first bus bar and the pulse inputs of all switching units with an even number are connected to a second bus bar and the input pulses are alternately led via both bus bars. Such counting chains need no delay elements, known per se, as they are necessary for a parallel control over only one bus bar and are, furthermore, not bound to a periodic control pulse sequence.

During the undisturbed condition of the counting chain only one switching unit is always in operative position. However, it may occur that this normal condition of the counting chain is disturbed, for example, by interfering pulses on the control leads or on the current-feeding leads of the switching units. Either all switching units can be in resting position or two or more switching units can assume the operative condition.

The object of the invention is to create a counting chain in which the normal condition, after interferences, is restored.. This is achieved according to the invention by starting the counting chain by use of a first coincidence circuit and restoring the counting chain, after each rundown, by means of a second coincidence circuit. In a preferred embodiment the first coincidence circuit is controlled by pulses on a bus bar and by the potential at certain outlets of all switching units, and that the second coincidence circuit is controlled by pulses on a bus bar and by the potential at an output of the final switching unit.

Figure 1:
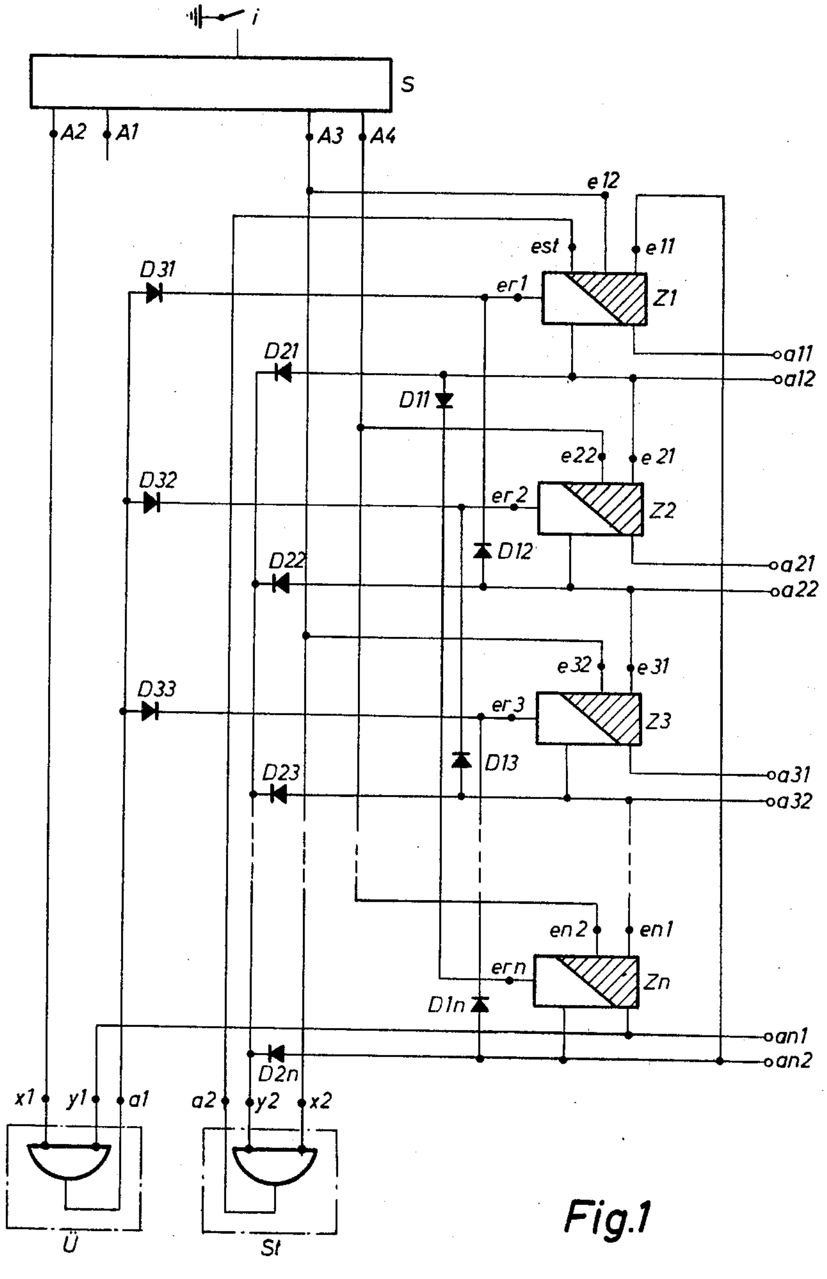
Figure 2:
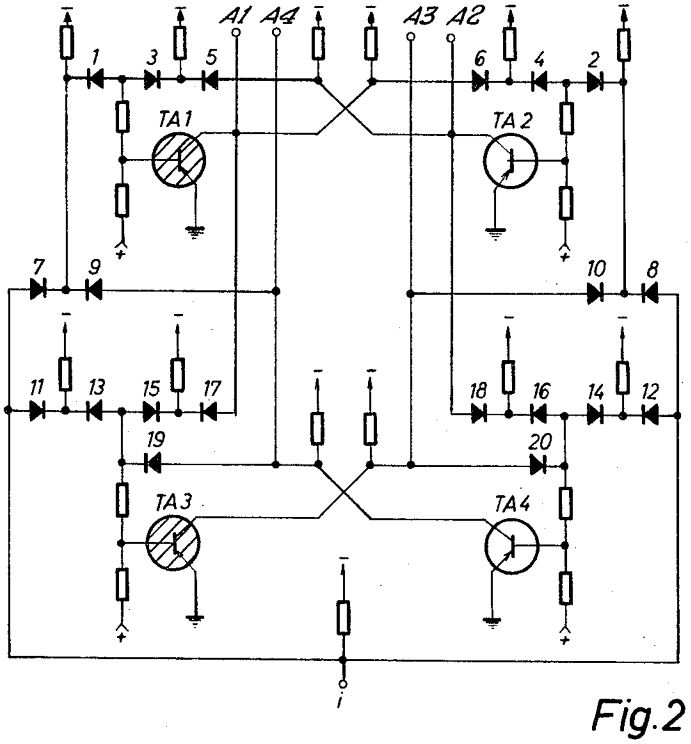
Figure 3:
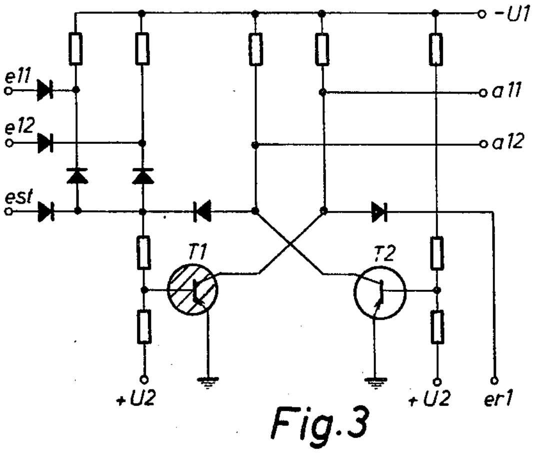
Figure 4:
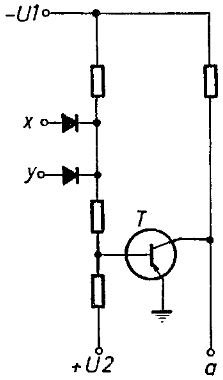
Figure 5:
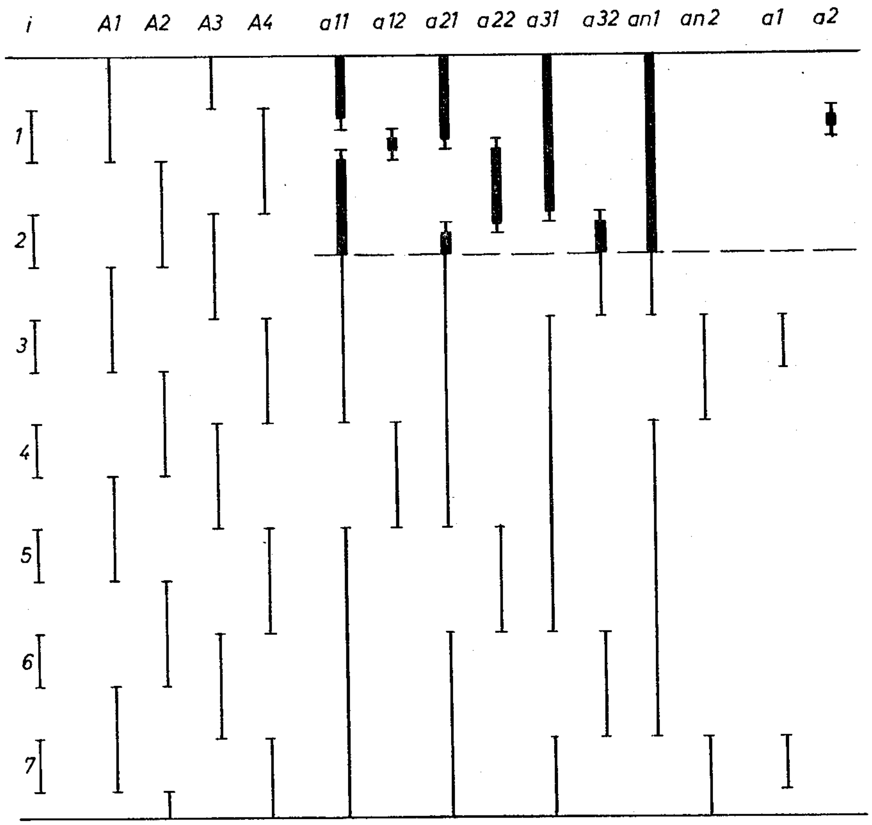

The invention is now explained in detail with the aid of an example and the accompanying drawings, wherein:

FIG. 1 shows a counting chain with a starting, a supervision, and a control circuit in an exemplary block diagram, FIG. 2 shows an example of a control circuit, FIG. 3 shows an example of a switching unit, FIG. 4 shows an example of a starting and supervising facility, and FIG. 5 shows a pulse diagram of a counting chain of use with FIG. 1.

The counting chain shown in FIG. 1 is constructed as a closed-circuit arrangement and consists of *n* equal switching units Z1–Z*n*, each switching unit possessing two control inputs *e* (e.g. *e*11, *e*12), a starting input *est*, a restoring input *er* (*er*1), and two outputs *a* (*a*11, *a*12). Always one of the control inputs *e* (*e*11) is connected with that output *a* (*an*2) of the preceding switching unit which normally provides no pulse potential, whereas the other control inputs (pulse inputs) of the switching units with odd numbers are connected to a bus bar A3, and the control inputs of the switching units with an even number are connected to a bus bar A4. The input pulses are alternately led through said bus bars. By a coincident control at both control inputs *e* or by control via the starting input *est* the switching unit can be brought from the resting position into the operating position. Thereby the potential conditions change at both outputs *a*. The output of each switching unit connected with the input of the following switching unit is coupled with the restoring facility *er* of the preceding switching unit via a decoupling diode D1 (D11–D1*n*).

A starting device S*t* is constructed as a coincidence circuit, having two inputs *x*2, *y*2, and one output *a*2. The input *x*2 is connected with the bus bar A3, while the input *y*2 is connected to the outputs *a*12–*an*2 via the decoupling diodes D21–D2*n*. The output *a*2 is connected to the starting input *est* of the first switching unit Z1.

A supervising facility Ü is also constructed as a coincidence circuit, having two inputs *x*1, *y*1 and one output *a*1. The input *x*1 is connected to a separate bus bar A2 and the input *y*1 to the output *an*1 of the last switching unit Z*n*, normally furnishing pulse potential, whereas the output *a*1 is connected with the restoring inputs *er*1–*er*3 of the switching units via decoupling diodes D31–D33, except for the last switching unit Z*n*.

The bus bars A2–A4 are fed from a control circuit S, which, in turn, is controlled for example by a pulse contact *i*. Pulses occur at the bus bar A2 which are staggered by half an impulse width compared with the pulses on the bus bars A3, A4.

The control circuit S may be a trigger circuit with four transistors TA1–TA4, as shown in FIG. 2. In FIG. 2 AND-circuits, consisting of resistors and diodes, inserted into the base circuit, precede the transistors, and AND-circuits being connected with the first inputs (via diodes 7, 8, 11, 12) to the control lead *i*, and with the second inputs (via diodes 5, 6, 17, 18) being connected to the collectors of transistors TA1, TA2. The transistors TA3, TA4 are, in addition, fed back mutually and directly via diodes 19, 20, and connected on the collector end via the diodes 9, 10, in a certain way with the AND-circuits preceding the transistors TA1, TA2.

It is assumed that the trigger circuit is in such a condition that the transistors TA1, TA3 are conductive (hatched on the drawing) and the transistors TA2, TA4 are cut-off, as the pulse diagram of FIG. 5 shows in the columns *i* and A1 to A4. A line means that the transistor is conductive and the collector grounded. With the commencement of the first ground impulse on the control line *i* the transistor TA3 is blocked, because the diode 11 becomes conductive and the diode 17 is conductive. The transistor TA3 immediately makes the transistor TA4 conductive via the diode 20 and causes blocking of diode 10. By the end of the first ground impulse the diode 8 ceases to be conductive so that now negative potential reaches the base of the transistor TA2 via the diode 2, making said transistor conductive. Transistor ΓA2 immediately changes the operation of transistor TA1 via the diode 5, because the other input of the corresponding AND-circuit was already marked through transistor TA4 and the diode 9. At the commencement of the second ground impulse the transistors TA3, TA4 change their switching condition, and at the end of the second ground impulse the transistor TA1, TA2 do the same, as can be easily gathered from the circuit diagram. After the end of the second ground impulse the aforedescribed original position of the trigger circuit is reached again. Thereby pulses are produced at the bus bar A2 which are staggered by half a pulse width compared with those at the bus bars A3, A4.

The switching units Z1–Z*n* may be bistable trigger stages with two transistors T1, T2 per unit according to FIG. 3. The normally conductive transistor T1 is controlled at the control inputs *e*11, *e*12 via an AND-circuit or directly at the starting input *est*, whereas the normally cut-off transistor T2 can again be brought into normal condition after reversing via the restoring input *er*1. The output *a*11 is connected with the collector of transistor T1 and the output *a*12 with the collector of transistor T2.

A coincidence circuit with a transistor T having a grounded emitter circuit can be used a starting and supervision facility, according to FIG. 4. The transistor T is conductive, if no ground potential is applied to both inputs or to one input *x*, *y*. Both inputs *x*, *y* are connected with a point of the base voltage divider through diodes and represent the inputs of an inverted AND-circuit. The collector of transistor T is the output *a* of said AND-circuit and has ground potential, if both inputs *x*, *y* have no ground potential.

The mode of action of the closed-circuit arrangement is now explained with the aid of the pulse diagram in FIG. 5. Beside the ground pulses on the control lead *i* and the bus bars A1–A4 pulses are shown on all outputs of the switching units Z1–Z*n* and the outputs of the starting and supervising facility S*t*, Ü. The starting process is more specifically represented in the right upper part of FIG. 5 (up to the dotted line) than the processes in the remaining part of the drawing. In the right upper part a thick line indicates the transistor as conductive and a small line shows the transistor in its transition, a line in the remaining part of the diagram indicates the conductive condition of said transistor.

The switching units Z1–Z*n* are all shown in non-operative condition in FIG. 1. The outputs *a*11–*an*1 have ground potential, whereas no ground potential (but negative potential) is applied to the outputs *a*12–*an*2. The closed-circuit arrangement therefore is in a troubled condition. The pulses on the bus bars A3, A4 cannot advance the closed-circuit arrangement, because for none of the switching units is coincidence obtained at the control inputs *e* (*e*11, *e*12).

The starting process is initiated when the bus bar A3 has no more ground potential at the commencement of impulse 1. At that moment the inputs *x*2, *y*2 are free from ground potential, whereas the output *a*2 furnishes ground potential and brings the switching unit Z1 into the operative condition via the starting input *est*. At the outputs *a*11, *a*12 the potential conditions change. As soon as a ground impulse occurs at the output *a*12 the starting device S*t* is restored again via the diode D21 and the control input *e*21 of the switching unit Z2 is operated, the other control input *e*22 is operated by the ground impulse on the bus bar A4. The ground impulse applied to the output *a*21 thereby ceases. The ground impulse at output *a*22 commences and restores the switching unit Z1 via the diode D12. With the commencement of the impulse 2 and the ground impulse applied to the bus bar A3 the switching unit Z3 is reverted which in turn restores the switching unit Z2, and so forth.

It is now assumed that the closed-circuit arrangement is in the other troubled condition in which two or more switching units are in the operative condition. When the arrangement has run down to the last switching unit Z*n* so that the output *an*1 has no more ground potential (commencement of impulse 3 or 7) ground potential is neither applied to the input *y*1 nor to the input *x*1 of the supervising facility Ü.

Therefore a ground impulse occurs at the output *a*1 which restores the switching units Z1–Z3 preceding the switching unit Z*n*. This ground impulse is terminated at the time of commencement of the ground impulse applied to the bus bar A2.

The ground restoring impulse is terminated automatically with the aid of the impulse applied to the bus bar A2 so that subsequent output pulses on the switching unit Z*n* and on the switching unit Z1 are not disturbed. It is possible to omit the bus bar A2 and to connect the input *x*1 for example with the bus bar A3. With the commencement of impulse 4 and the ground impulse to the bus bar A3 the supervising facility must first be restored, before an impulse can appear at the output *a*12. The shortening of said impulse is in some cases without disadvantage.

The counting chain only consists of statically operating and coupled switching elements and is less subject to troubles, compared with dynamic counting arrangements. Together with the measures according to the invention a high degree of operation security is obtained.

I claim:

1. An electronic counting chain comprising two groups of units arranged in a sequence such that individual units in one group alternate with individual units in the other group, a first bus coupled to the inputs of each unit in a first group of said units and to one input of a first AND gate, a second bus coupled to the outputs of each unit in said first group and another input of said first AND gate, a third bus coupled to the inputs of each unit in the other group of said units, means for applying drive pulses to said first and third busses alternately, a second AND gate coupled to the output of a terminating one of said units, means responsive to an output from said first AND gate for starting said counting chain, and means responsive to an output from said second AND gate for resetting said counting chain, whereby said one unit is made an end of a count cycle or terminating unit.

2. The counting chain of claim 1 wherein said first AND gate has an inverted output, decoupling diode means connected between said second bus and each of said unit outputs, said last named outputs being normally "off," and means for coupling the output of said first AND gate to a starting terminal on a first of said units.

3. The counting chain of claim 1 wherein said second AND gate has an inverted output, the input to said second AND gate being coupled to a normally "on" output of the last unit in said sequence of units, the output of said second AND gate being coupled to the reset terminal of all of said units except said terminating unit.

4. The counting chain of claim 3 and means for applying signal pulses to one input of said second AND gate a half-pulse width later than said drive pulses.

5. The counting chain of claim 4 and a trigger circuit for applying said drive and signal pulses, said trigger circuit comprising four transistors coupled in a double flip-flop configuration.

6. The counting chain of claim 2 wherein each of said AND gates comprises a transistor in a common emitter configuration with diode AND gate connections to its base electrode.

7. The counting chain of claim 1 wherein each of said units comprises a multivibrator circuit of transistors in a common emitter configuration, having diode isolated inputs coupled to the base electrodes of one transistor in said multivibrator circuit.

References Cited by the Examiner

UNITED STATES PATENTS

| | | | |
|---|---|---|---|
| 3,050,714 | 8/1962 | Campbell | 328—48 X |
| 3,054,059 | 9/1962 | Ingerman | 328—42 |
| 3,108,227 | 10/1963 | Robinson | 328—43 |
| 3,183,365 | 5/1965 | Ligotky | 307—88.5 |

ARTHUR GAUSS, *Primary Examiner.*

I. C. EDELL, *Assistant Examiner.*